United States Patent
Martin

(10) Patent No.: US 11,750,238 B1
(45) Date of Patent: Sep. 5, 2023

(54) SOUND REDIRECTING CASE

(71) Applicant: Paul G. Martin, Fullerton, CA (US)

(72) Inventor: Paul G. Martin, Fullerton, CA (US)

(*) Notice: Subject to any disclaimer, the term of this patent is extended or adjusted under 35 U.S.C. 154(b) by 0 days.

(21) Appl. No.: 17/823,609

(22) Filed: Aug. 31, 2022

Related U.S. Application Data

(63) Continuation-in-part of application No. 29/844,027, filed on Jun. 26, 2022.

(51) Int. Cl.
  *H04B 1/38* (2015.01)
  *H04B 1/3888* (2015.01)
  *H04M 1/02* (2006.01)

(52) U.S. Cl.
  CPC ........ *H04B 1/3888* (2013.01); *H04M 1/0281* (2013.01)

(58) Field of Classification Search
  CPC .... H04B 1/3888; H04M 1/035; H04M 1/185; G06F 1/1628
  See application file for complete search history.

(56) References Cited

U.S. PATENT DOCUMENTS

| | | | |
|---|---|---|---|
| 9,249,924 B1 | 2/2016 | Martin | |
| 11,251,824 B2* | 2/2022 | Flores | H04M 1/185 |
| 11,292,651 B2* | 4/2022 | Oh | B32B 27/08 |
| 2022/0209809 A1* | 6/2022 | Wright | H04M 1/035 |

* cited by examiner

*Primary Examiner* — Tuan Pham
(74) *Attorney, Agent, or Firm* — CIONCA IP Law P.C.; Marin Cionca

(57) ABSTRACT

A mobile device case having a case body having a cavity configured to receive a mobile device, a plurality of sound channels nested within the case body and a cavity wall associated with the case body, wherein the cavity wall is configured to form a sound chamber within the cavity, wherein the sound chamber is in sound communication with a speaker of the mobile device and the plurality of sound channels, thus allowing sound emitted from the speaker of the mobile device to be guided to the plurality of sound channels. An advantage of the mobile device case is that the plurality of sound channels nested within the case may redirect sound from speakers on the device to allow sound to escape out of the front and back of the mobile device case, thus redirecting sound to a device user and preventing the mobile device case from muffling the sound.

20 Claims, 9 Drawing Sheets

SOUND REDIRECTING CASE

CROSS-REFERENCE TO RELATED APPLICATIONS

This application is a continuation-in-part and claims the benefit of U.S. Design Application No. 29/844,027, filed Jun. 26, 2022, which is hereby incorporated by reference, to the extent that it is not conflicting with the present application.

BACKGROUND OF INVENTION

1. Field of the Invention

The invention relates generally to device cases and specifically mobile device cases configured to redirect sound emitted from a held mobile device.

2. Description of the Related Art

Many mobile device users make use of device cases in order to suitably protect their mobile device from damage that may result from dropping or otherwise impacting said device. These device cases are often designed to provide a suitable amount of impact protection, while still retaining a sleek form factor that does not significantly increase the size of the held mobile device. These protective cases however may cover critical portions of the held device, reducing their efficacy and/or impeding a user's access to them. Many device cases also block or improperly direct the sound emitted from speakers on the device, such that the volume, audio quality and capability to provide a surround sound experience to a user is greatly diminished. Such cases may direct sound out of only a bottom portion of the device case, thus funneling sound in only one direction. Additionally, many device cases may lack a suitable handle to securely hold the device, thus requiring the user to wrap their hand around it, thus limiting a user's available options to hold the device.

Therefore, there is a need to solve the problems described above by proving a device and method for a device case that suitably engages with a device to redirect emitted sound, allows easy access to device buttons and ports and provides a handle for easy handling.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, a mobile device case is provided, the mobile device case comprising: a case body configured to secure a device, the case body having: a case back; a top side wall attached to the case back; a bottom side wall attached to the case back, the bottom side wall having a plurality of nested bottom side ports; a right side wall attached to the case back, top side wall and bottom side wall; a left side wall attached to the case back, top side wall and bottom side wall; wherein the top side wall is parallel with the bottom side wall and the right side wall is parallel with the left side wall, such that a cavity is formed between the top side wall and bottom side wall, the cavity being configured to receive the mobile device; a first plurality of forward facing and backward facing sound channels nested within left side wall; a second plurality of forward facing and backward facing sound channels nested within right side wall; a cavity wall associated with the case body, wherein the cavity wall is configured to form a sound chamber within the cavity, wherein the sound chamber is in sound communication with a speaker of the mobile device and the plurality of sound channels, thus allowing sound emitted from the speaker of the mobile device to be guided to the plurality of sound channels. Thus, an advantage is that sound emitted from the held device may be redirected out of the sound channels in order to provide a user with an improved sound experience. In this way, the direction of the sound emitted from the device may be passively controlled without the use of auxiliary electronic elements. Another advantage is that a handling strap may be provided on the case body, such that the user has a quick and easy way to securely engage with the case, thus reducing the likelihood that the user will drop the device by mistake. Another advantage is that a strap support associated with the handling strap may cause the handling strap to protrude away from the held device, thus making it easier for a user to engage their hand with the handling strap. Another advantage is that the handling strap being built into the case itself minimized the bulk of the case, thus making it easier to store when not in use.

In another aspect, a mobile device case is provided, the mobile device case comprising: a case body configured to secure a mobile device, the case body having: a case back; a right side wall attached to the case back; and a left side wall attached to the case back, wherein a cavity is formed between the right side wall and the left side wall, the cavity being configured to receive the mobile device; a plurality of forward facing sound channels nested within the case body; a plurality of backward facing sound channels nested within the case body; and a cavity wall associated with the case body, wherein the cavity wall is configured to form a sound chamber within the cavity, wherein the sound chamber is in sound communication with a speaker of the mobile device and the plurality of sound channels, thus allowing sound emitted from the speaker of the mobile device to be guided to the plurality of sound channels. Again, an advantage is that sound emitted from the held device may be redirected out of the sound channels in order to provide a user with an improved sound experience. In this way, the direction of the sound emitted from the device may be passively controlled without the use of auxiliary electronic elements. Another advantage is that a handling strap may be provided on the case body, such that the user has a quick and easy way to securely engage with the case, thus reducing the likelihood that the user will drop the device by mistake. Another advantage is that a strap support associated with the handling strap may cause the handling strap to protrude away from the held device, thus making it easier for a user to engage their hand with the handling strap. Another advantage is that the handling strap being built into the case itself minimized the bulk of the case, thus making it easier to store when not in use.

In another aspect, a mobile device case is provided, the mobile device case comprising: a case body having a cavity configured to receive a mobile device; a plurality sound channels nested within the case body; and a cavity wall associated with the case body, wherein the cavity wall is configured to form a sound chamber within the cavity, wherein the sound chamber is in sound communication with a speaker of the mobile device and the plurality of sound channels, thus allowing sound emitted from the speaker of the mobile device to be guided to the plurality of sound channels. Again, an advantage is that sound emitted from the held device may be redirected out of the sound channels in order to provide a user with an improved sound experience. In this way, the direction of the sound emitted from the device may be passively controlled without the use of auxiliary electronic elements. Another advantage is that a handling strap may be provided on the case body, such that the user has a quick and easy way to securely engage with the case, thus reducing the likelihood that the user will drop the device by mistake. Another advantage is that a strap support associated with the handling strap may cause the handling strap to protrude away from the held device, thus making it easier for a user to engage their hand with the handling strap. Another advantage is that the handling strap being built into the case itself minimized the bulk of the case, thus making it easier to store when not in use.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which.

DETAILED DESCRIPTION

Figure 1:
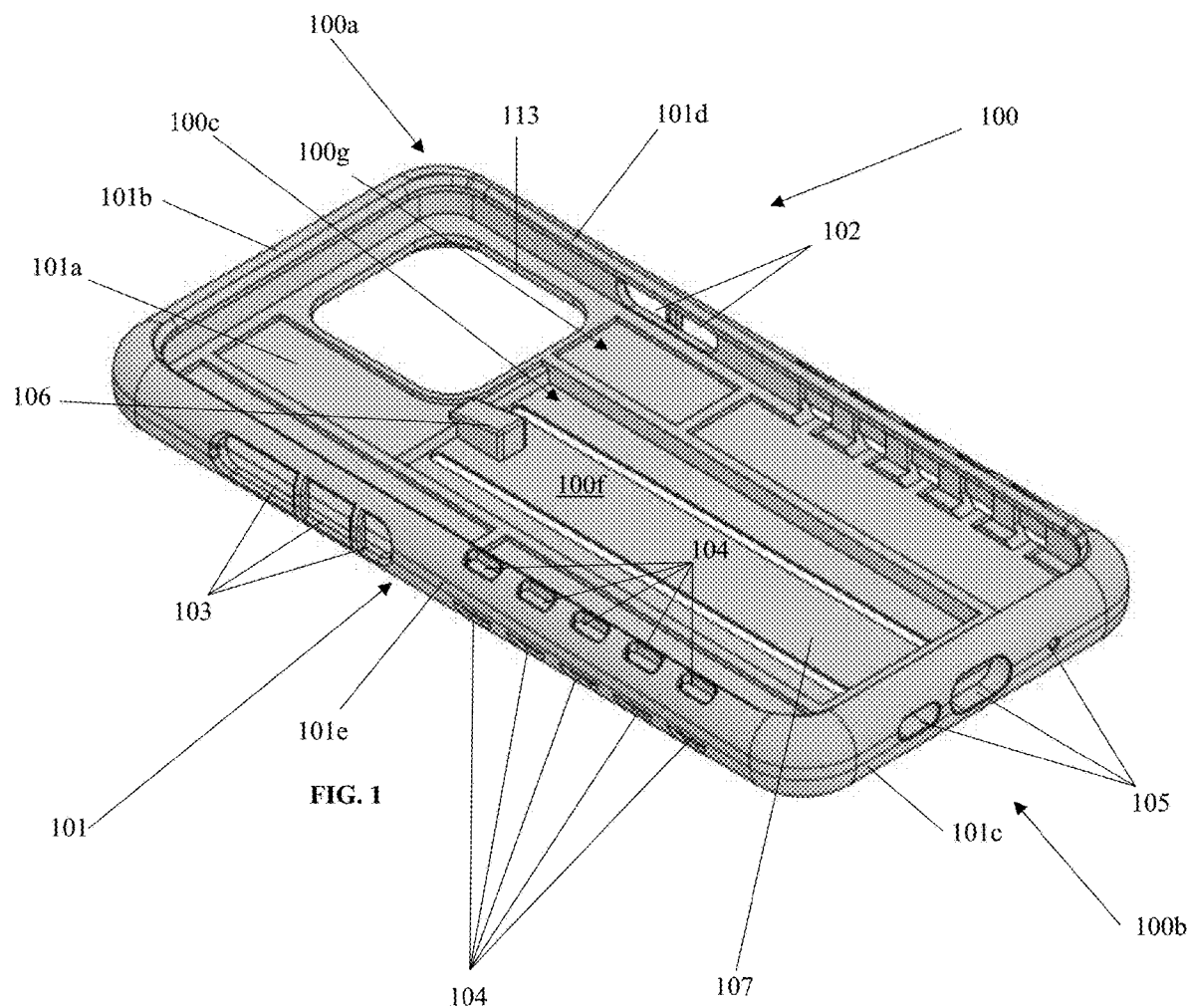
FIG. 1 illustrates a perspective view of the disclosed sound redirecting case, according to an aspect.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some structural components or steps that are known in the art are not shown or described if they are not necessary for the invention to be understood by one of ordinary skills in the art.

As used herein and throughout this disclosure, the term "mobile device" refers to any electronic device capable of communicating across a mobile network. A mobile device may have a processor, a memory, a transceiver, an input, and an output. Examples of such devices include cellular telephones, personal digital assistants (PDAs), portable computers, etc. The memory stores applications, software, or logic. Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEPROMS (electrically erasable programmable read-only memories). A transceiver includes but is not limited to cellular, GPRS, Bluetooth, and Wi-Fi transceivers.

Mobile devices communicate with each other and with other elements via a network, for instance, a cellular network. A "network" can include broadband wide-area networks, local-area networks, and personal area networks. Communication across a network can be packet-based or use radio and frequency/amplitude modulations using appropriate analog-digital-analog converters and other elements. Examples of radio networks include GSM, CDMA, Wi-Fi and BLUETOOTH® networks, with communication being enabled by transceivers. A network typically includes a plurality of elements such as servers that host logic for performing tasks on the network. Servers may be placed at several logical points on the network. Servers may further be in communication with databases and can enable communication devices to access the contents of a database. For instance, an authentication server hosts or is in communication with a database having authentication information for users of a mobile network. A "user account" may include several attributes for a particular user, including a unique identifier of the mobile device(s) owned by the user, relationships with other users, call data records, bank account information, etc. A billing server may host a user account for the user to which value is added or removed based on the user's usage of services. One of these services includes mobile payment. In exemplary mobile payment systems, a user account hosted at a billing server is debited or credited based upon transactions performed by a user using their mobile device as a payment method.

For the following description, it can be assumed that most correspondingly labeled elements across the figures (e.g., 105 and 205, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

FIG. 1 illustrates a perspective view of the disclosed sound redirecting case 100, according to an aspect. The disclosed sound redirecting case 100 is configured to engage with or otherwise secure a device, in order to provide a variety of unique features and functionalities that allow the sound redirecting case to provide a user with an enhanced audio and device handling experience. The disclosed sound redirecting case ("redirecting case", "mobile device case", "device case") 100 may be comprised of a case body 101, wherein said case body is comprised of a case back 101a configured to seat the back portion of a device, such as a cellphone, tablet, smart device, or other suitable mobile device. This case back 101a may have a camera cutout 113 nested within it, such that the redirecting case 100 does not block a camera on the secured device.

The case body 101 is configured to secure a suitable device. The case body 101 may be further comprised of a plurality of side walls ("walls") attached to or associated with the case back 101a, including a top wall ("top side wall") 101b, a bottom wall ("bottom side wall") 101c, a right wall ("right side wall") 101d and a left wall ("left side wall") 101e. Each wall may also be attached to adjacent walls, such that the top wall 101b is attached to the right wall 101d and the left wall 101e at the top portion 100a of the redirecting case 100, and the bottom wall 101c is attached to the right wall 101d and the left wall 101e at the bottom portion 100b of the redirecting case 100. In such an embodiment, the top wall 101b and bottom wall 101c may be parallel to each other and the right wall 101d and left wall 101e may be parallel to each other. These side walls 101b, 101c, 101d and 101e are configured to coordinate with the case back 101a to form a cavity 100c, such that upon insertion of a device, such as mobile device 1112 of FIG. 11, within said cavity 100c, the redirecting case 100 surrounds and snuggly engages with the device in order secure said device within the redirecting case 100. The cavity 100c may be comprised of a strap chamber 100f surrounded by a perimeter chamber 100g, wherein a handling strap 107 is housed within said strap chamber 100f.

Certain side walls may be provided with a variety of features in order to facilitate the desired device functionalities. As such, the bottom wall 101c may have a plurality of bottom ports 105, the right wall 101d may have a plurality of right side ports 102 and the left wall 101e may have a plurality of left side ports 103. The bottom ports 105, right side ports 102 and left side ports 103 nested within their corresponding side walls may be configured to allow a user to easily access the buttons and other interfacing elements on the secured device, to ensure full functionality of the device is maintained, despite the redirecting case 100 surrounding and protecting the device. Additionally, the right side wall 101d and left side wall 101e may have a plurality nested sound channels 104 configured to allow sound emitted from the device to be partially redirected out of the right side wall 101d and left side wall 101e of the redirecting case 100. This will ensure that the sound emitted from the device is not muffled by the device case or forced to exit through only the bottom ports 105, thus improving the audio experience for a user. The top wall 101b of a redirecting case 100 may have no notable ports or slots, unless ports or slots are necessitated by the presence of interfacing elements, charging ports, etc., on a top side of the held device.

The plurality of right side ports 102 and the plurality of left side ports 103 may be disposed on the top portion 100a of the device case 100, whereas the sound channels 104 and the bottom side ports 105 may be disposed on the bottom portion 100b of the device case 100. It should be understood the positioning of each of the ports 102, 103, 105 and sound channels 104 may be adapted such that the ports allow access to corresponding buttons and ports on the device and the sound channels 104 suitably align, coordinate with or otherwise establish sound communication ("audio communication") with speakers on the device to suitably redirect emitted sound.

The handling strap ("strap") 107 may be built into it the structure of the case back 101a, such that a user may insert their hand between the handling strap 107 the case back 101a to establish a secure to the redirecting case 100, and thus the held device. A strap support 106 may be attached to or otherwise associated with the handling strap and disposed within the cavity 100c, such that the strap support 106 may engage and press against the held device, causing the attached handling strap 107 to protrude out slightly away from the device, while also preventing the handling strap 107 from bending or collapsing into the cavity 100c. The strap support 106 and handling strap 107 will be discussed in greater detail hereinbelow. It should be understood that the device may be inserted into the cavity 100c to allow for the engagement between the device and the device case 100.

The disclosed redirecting case 100 and its various elements may be made of suitable materials in order to protect the phone while allowing a user to hold the redirecting case 100 through easy engagement with the disclosed handling strap 107. In order to provide impact resistance to the held device, the redirecting case 100 may be comprised of a sturdy, but flexible material, such as rubber and/or plastic. In an embodiment, the disclosed redirecting case 100, and all of its elements, may be made of thermoplastic polyurethane (TPU). Other materials, such as plastics and foams having good shock absorption properties, may also be utilized to provide a strong and flexible case to surround and protect a held device.

Figure 2:
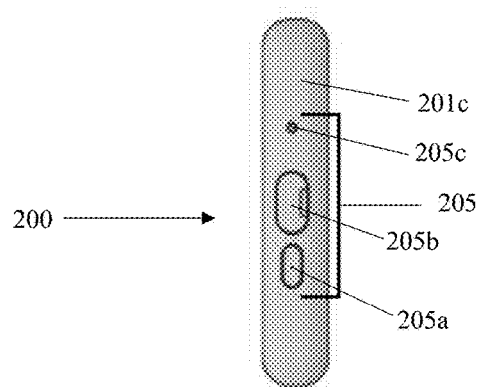
FIG. 2 illustrates the bottom view of the disclosed sound redirecting case, according to an aspect.
Figure 3:
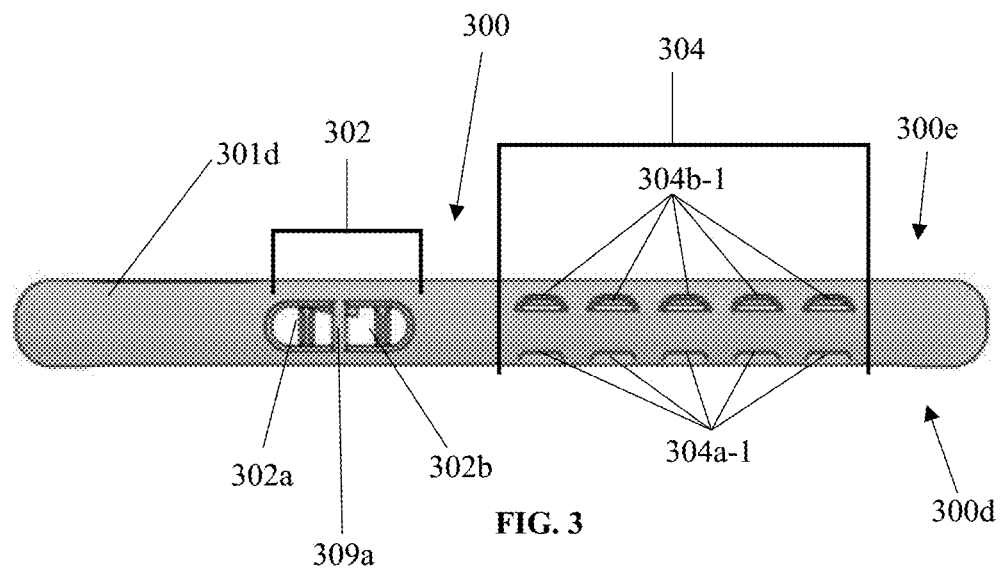
FIG. 3 illustrates the right side view of the disclosed sound redirecting case, according to an aspect.
Figure 4:
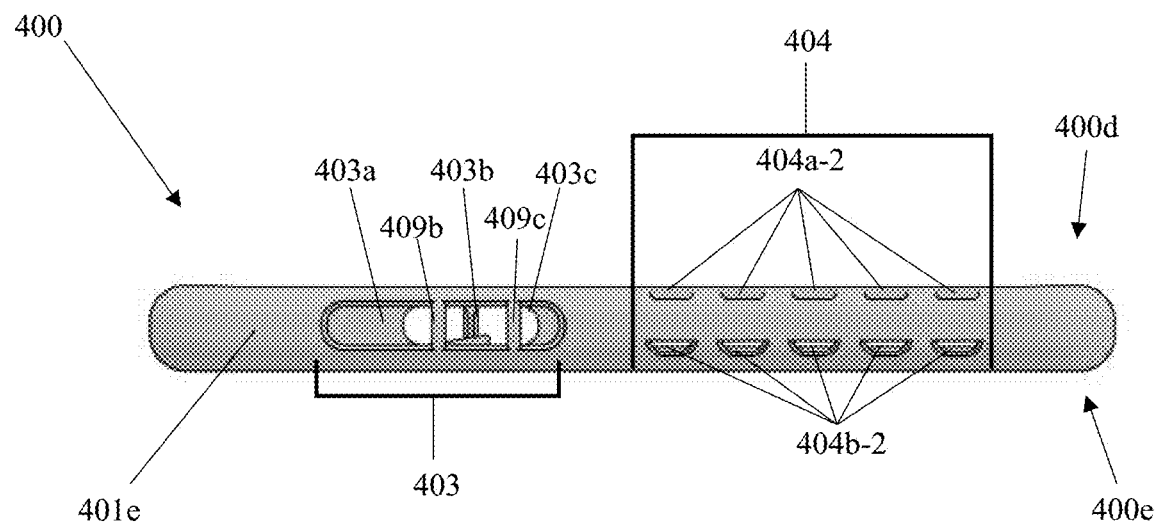
FIG. 4 illustrates the left side view of the disclosed sound redirecting case, according to an aspect.

FIG. 2 illustrates the bottom view of the disclosed sound redirecting case 200, according to an aspect. FIG. 3 illustrates the right side view of the disclosed sound redirecting case 300, according to an aspect. FIG. 4 illustrates the left side view of the disclosed sound redirecting case 400, according to an aspect. As will be described hereinbelow, each of the applicable side walls of the redirecting case 200, 300, 400 may be fitted with a plurality of ports and/or channels to suitably facilitate proper device function.

In the device case embodiment 200 of FIG. 2, it can be seen that the plurality of bottom ports 205 nested within the bottom wall 201c may be comprised of a first bottom port 205a, a second bottom port 205b and a third bottom port 205c. In said embodiment, each of the bottom ports 205 may provide access to a relevant element of the device, such as a charging port, headphone jack, data transfer port, etc., such that the redirecting case 200 does not block access to ports on the device. In said embodiment, the third bottom port 205c may be referred to as a surround sound hole 205c, wherein said surround sound hole 205c is configured to redirect the majority of the sound emitted from a speaker on the held device to the sound channels, such as sound channels 104 of FIG. 1. A portion of the sound may also travel out of the surround sound hole 205c to further facilitate the herein described improved sound experience by still allowing some sound to be emitted from the bottom of the device case. As such, the surround sound hole 205c nested within the case body is configured to emit a portion of the sound emitted from the device while redirecting the majority of the sound through the sound chamber, such as surround sound chamber 610 of FIG. 6, to the pluralities of sound channels. This surround sound hole 205*c* may be nested within the case body to be in audio communication with the speaker(s), regardless of said speaker(s) positioning on the device. In the embodiment of FIG. 2, the surround sound hole 205*c* may be circular, but other shapes of surround sound hole 205*c* may also be utilized, so long as said surround sound hole provides a suitably sized cross-sectional area for sound to escape from the bottom wall 201*c* of the case 200, as disclosed hereinbelow.

In the device case embodiment 300 of FIG. 3, the plurality of right side ports 302 nested within the right side wall 101*d* may be comprised of a first right side port 302*a*, and a second right side port 302*b*. A first dividing pillar 309*a* may be disposed between the first right side port 302*a* and a second right side port 302*b*, thus separating the two right side ports 302*a*, 302*b*. In said embodiment, these right side ports 302 may provide access to the volume controls for a phone or other device, particularly the volume up and volume down buttons on the held device.

In the device case embodiment 400 of FIG. 4, the plurality of left side ports 403 nested within the left side wall 401*e* may be comprised of a first left side port 403*a*, a second left side port 403*b* and a third left side port 403*c*. A second dividing pillar 409*b* may be disposed between the first left side port 403*a* and the second left side port 403*b*, and a third dividing pillar 409*c* may be disposed between the second left side port 403*b* and the third left side port 403*c*, thus separating these three left side ports. In said embodiment, these left side ports 403 may provide access to a power button on a phone or other device, and various other function interfaces, such as a silencing button/tab. It should be understood that the hereinabove described embodiments are provided purely as examples. The positioning, size, shape and quantity of the ports in each wall of the redirecting case 200, 300, 400 may be modified to suit any compatible device requiring a cover, while still allowing access to each port on said device.

In order to suitably allow for sound to be emitted from the device without being impeded by the surrounding device case 200, 300, 400, a plurality of sound channels 304, 404 may be nested within the case body. These sound channels 304, 404 may be positioned on the device case such that sound may be redirected from the device speakers within the cavity to the external environment, thus allowing the user to hear the sound more clearly. In order to provide the user with an improved surround sound experience, the sound channels 304, 404 may be distributed and arranged as discussed hereinbelow.

In order to provide a user with a surround sound experience, it may be necessary to redirect sound both toward and away from the user. In order to enable this feature, the device case may be provided with two different orientations of sound channels: forward facing sound channels 304*a*-1, 404*a*-2 disposed on the forward facing portion 300*d*, 400*d* of the device case 300, 400 and backward facing sound channels 304*b*-1, 404*b*-2 disposed on the backward facing portion 300*e*, 400*e* of the device case 300, 400. The plurality of forward facing sound channels 304*a*-1, 404*a*-2 disposed on the device case 300, 400 may be distributed between the left side wall 401*e* and right side wall 301*d*. Similarly, the plurality of backward facing sound channels 304*b*, 404*b* disposed on the device case 300, 400 may be distributed between the left side wall 401*e* and right side wall 301*d*. As such, the plurality of sound channels nested within the device case 300, 400 may be classified into four different pluralities: a first plurality of forward facing sound channels 304*a*-1 nested within the right side wall 301*d*, a first plurality of backward facing sound channels 304*b*-1 nested within the right side wall 301*d*, a second plurality of forward facing sound channels 404*a*-2 nested within the left side wall 401*e*, and a second plurality of backward facing sound channels 404*b*-2 nested within the left side wall 401*e*. In an embodiment, five forward facing sound channels may be disposed on each left and right side wall. In the same embodiment, five backward facing sound channels may also be disposed on each left and right side wall. In said embodiment, the disclosed device case 300,400 may have a total of twenty sound channels.

It should be understood that while the forward facing sound channels 304*a*-1, 404*a*-2 and backward facing sound channels 304*b*-1, 404*b*-2 may also be angled such that they also face sideways based on the corresponding side wall they are nested within, said sound channels may still be referred to throughout as forward/backward facing sound channels, accordingly, for brevity. For example, the first plurality of forward facing channels 304*a*-1 and the first plurality of backward facing channels 304*b*-1 may also be angled such that they are facing forward and backward accordingly, but also sideways away from the right side of the redirecting case, such that the first plurality of forward facing channels 304*a*-1 directs sound toward the viewer and outward away from the right of the redirecting case, and the first plurality of backward facing channels 304*b*-1 directs sound backward away from the viewer and outward away from the right of the redirecting case. Similarly, the second plurality of forward facing sound channels 404*a*-2 and the second plurality of backward facing sound channels 404*b*-2 may direct sound forward toward the viewer and backward away from the viewer accordingly, as well as sideways outward away from the left side of the redirecting case. In this way, the sound channels facilitate redirection of sound out of the front, back, left and right sides of the redirecting case, while the surround sound hole, such as surround sound hole 205*c* of FIG. 2 redirects sound out of the bottom of the redirecting case, thus providing the user with surround sound.

In the disclosed device case embodiments 300, 400 of FIG. 3-4, each of the disclosed forward facing sound channels 304*a*-1, 404*a*-2 and backward facing sound channels 304*b*-1, 404*b*-2 may have the same shape and dimensions. In said embodiments, the disclosed sound channels 304*a*-1, 304*b*-1, 404*a*-2, 404*b*-2 may each have a rectangular cross-section with rounded corners. This particular shape of sound channel may also be seen in the device case embodiment 500 of FIG. 5. It should be noted that the disclosed sound channels may also be provided in different shapes, such as in an alternative embodiment in which the sound channels may have a circular cross section. As long as the implemented sound channels provide a sufficiently large opening area into the device case from the surrounding environment, such that sound traveling within the sound channel may suitably escape said device case, the size, quantity and shape of each sound channel used may be modified. As such, the sound channels may be provided in various sizes, shapes, and quantities, as long as the total cross sectional areas of the sound channels is sufficiently large to appropriately direct sound from within the sound channel forward (toward the user), backward (away from the user) and to both lateral side (left and right) of the device case 300,400 in order to facilitate the surround sound capabilities disclosed herein.

Figure 5:
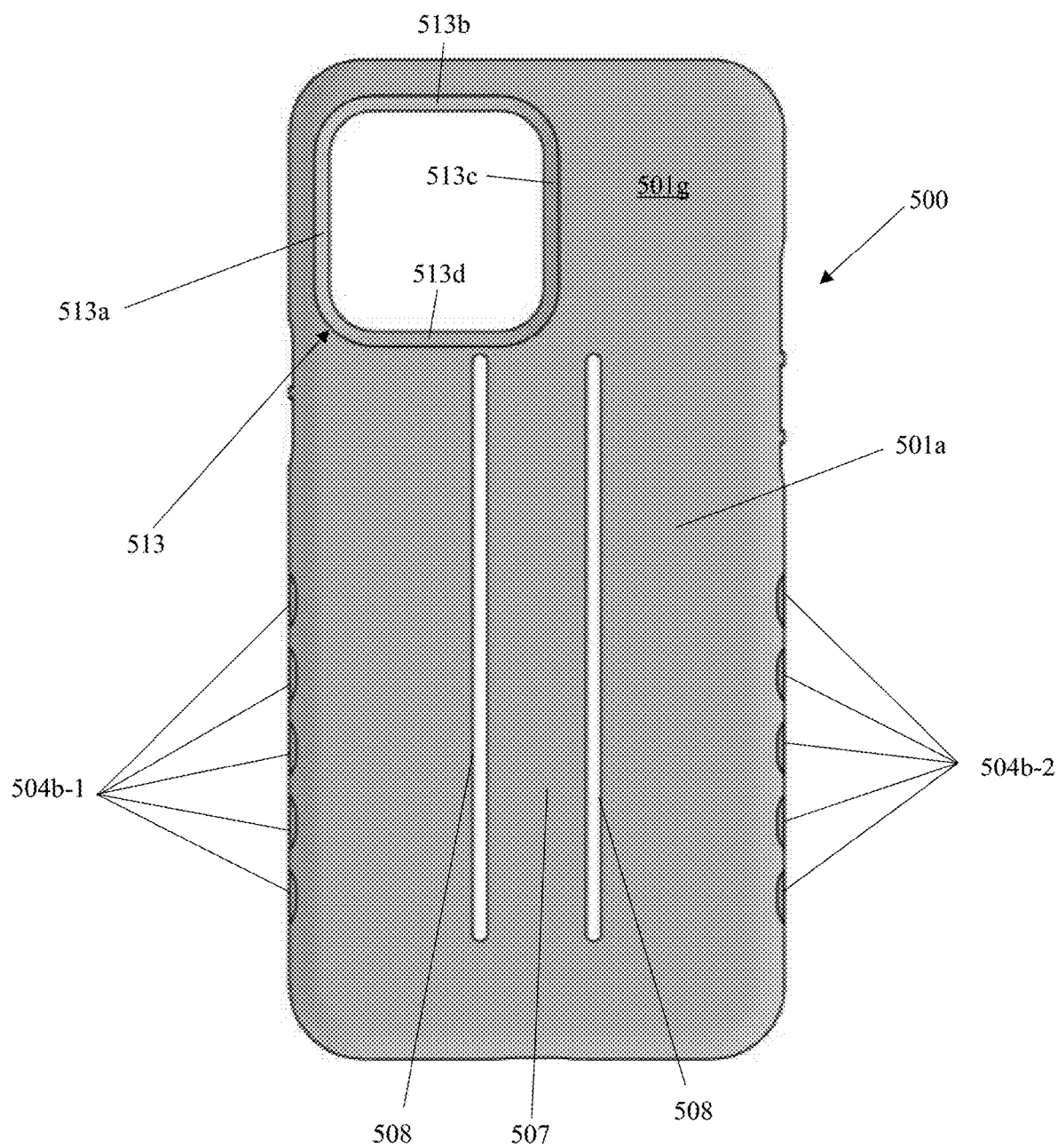
FIG. 5 illustrates the back view of the disclosed sound redirecting case, according to an aspect.

FIG. 5 illustrates the back view of the disclosed sound redirecting case, according to an aspect. As described previously, the handling strap 507 disposed on the case back 501a may allow a user to comfortably and securely hold the device secured within the redirecting case 500. This handling strap 507 may be formed within the case back 501a as the result of back slots 508 nested within the case back 501a. These back slots 508 may be nested within the case back 501a and may travel through the case back 501a, such that sound may also travel outward through the back slots 508, as part of the surround sound capabilities provided by the case. These back slots 508 may also provide the user with an access point to insert their fingers between the handling strap 507 and the case back 501a to engage with the redirecting case 500. The back slots 508 may be large enough for a user to insert the tip of their finger into, and the handling strap 507 may be made of a material flexible enough to allow a user to easily insert their fingers between the handling strap 507 and case back 501a.

As mentioned hereinabove, a camera cutout 513 may be nested within the case back 501a, such that a camera on the held device is not obscured by the redirecting case 500. The camera cutout 513 may avoid obscuring the camera by having angled cutout walls 513a-513d configured to angle away from the view of the camera. These angled cutout walls 513a-513d may each form a 225 degree angle with the outer surface 501g of the case back 501a to prevent the case body from being seen by the camera. The backward facing sound channels 504b-1, 504b-2 may be visible from the back view of the redirecting case, as seen in FIG. 5, and said backward facing sound channels 504b-1, 504b-2 may be configured to direct sound away from a user holding the device, and outward sideways from the corresponding side walls, while in use.

Figure 6:
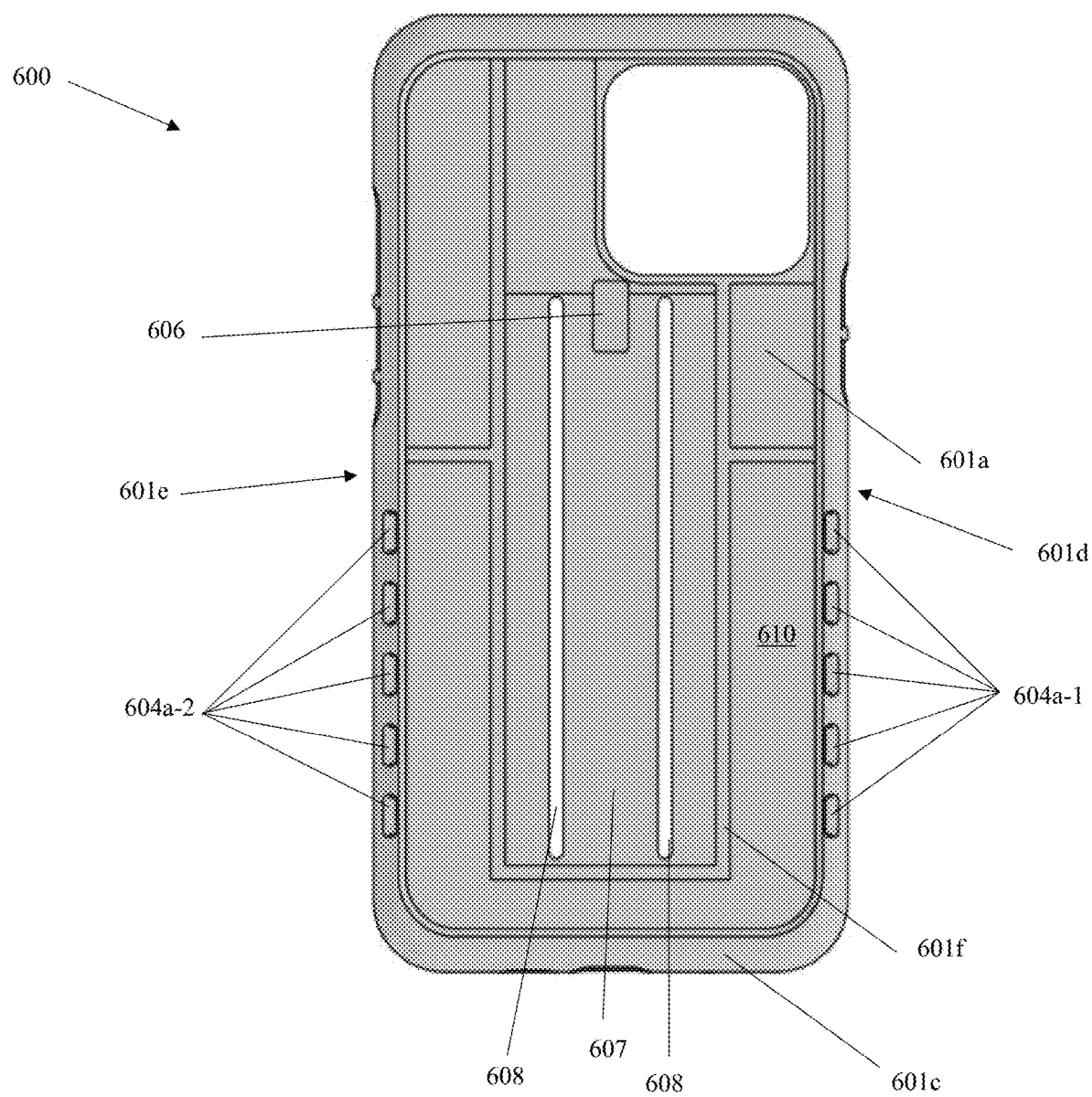
FIG. 6 illustrates the front view of the disclosed sound redirecting case, according to an aspect.

FIG. 6 illustrates the front view of the disclosed sound redirecting case 600, according to an aspect. In order to make it easier for a user to engage with the handling strap 607 of the redirecting case 600, a strap support 606 may be disposed on the handling strap 607 within the cavity 600c. Upon insertion of a device within the cavity 600c, the strap support 606 may engage with said device, such that the handling strap 607 does not collapse into the cavity 600c. In an embodiment, the strap support 606 and handling strap 607 may be configured such that the handling strap 607 protrudes away from the device secured within the cavity 600c. In such a configuration, the back slots 608 may be enlarged as a result of this protrusion of the handling strap 607, making it easier for a user to insert their fingers between the handling strap 607 and the case back 601a. While the case back 601a, handling strap 607 and strap support 606 may be formed of a unified, monolithic piece of material, it should be understood that each of these elements may be comprised of a unique material based on their required rigidity and flexibility. For example, the handling strap may be made of a more elastic material than the case back 601a, such that it is easier for a user to slot their fingers between the handling strap 607 and the case back 601a. In an embodiment, the disclosed redirecting case may be comprised of two different materials, including TPU plastic and acrylonitrile butadiene styrene (ABS) plastic, wherein the handling strap 607 may be made of TPU plastic and the remainder of the redirecting case 600 may be made of ABS plastic. In an alternate embodiment, the redirecting case 600 may be made from only TPU plastic to simplify fabrication. The forward facing sound channels 604a-1, 604a-2 may be visible from the front view of the redirecting case, as seen in FIG. 6, and said forward facing sound channels 604a-1, 604a-2 may be configured to direct sound toward the a user holding the device while in use, as well as left and right out of the corresponding side walls of said redirecting case 600.

As can be seen in FIG. 6, a cavity wall 601f associated with the case body 601/case back 601a is configured to form a sound chamber 610 within the cavity, said sound chamber 610 being configured to help control and direct the flow of sound emitted from the device. The prior disclosed surround sound hole, such as surround sound hole 205c of FIG. 2, is configured to redirect the majority of the sound emitted from the speaker on the device within the sound chamber 610 toward the sound channels and away from the bottom side wall 601c of the case 600. The sound chamber 610 is configured to work in conjunction with the surround sound hole to redirect sound from the bottom of the device to the sound channels disposed in the left 601e and right 601d side walls of the case 600. The cavity wall 601f is configured such that sound within the sound chamber 610 is guided out of the sound channels 604a-1, 604a-2 to provide the secured device with surround sound capabilities. It should be understood that the sound chamber 610 is in sound communication with the speaker(s) of the held device and the plurality of sound channels 604a-1, 604a-2, thus allowing sound emitted from the speaker of the held device to be guided to the plurality of sound channels.

It should be understood that the disclosed device case 600 may be configured to redirect sound emitted from a speaker(s) on the bottom of a device and/or the lateral sides of the device (left and right sides). As can be seen in FIG. 6, the sound chamber 610 is configured to engage with/be in audio communication with both the left and rights sides of the secured device as well as the side portions of the device, such that sound emitted from speakers on the bottom or sides of the device may be suitably enclosed within the sound chamber 610 and guided to the sound channels 604a-1, 604a-2 and surround sound hole to direct sound both toward and away from the user. Even if speakers are disposed on the lateral sides of the device, sound may still be directed out of the bottom ports, such as surround sound port 205c of FIG. 2, as a result of the bottom ports being in audio communication with the sound chamber 610 and thus with the bottom and sides of the device upon engagement.

Figure 7:
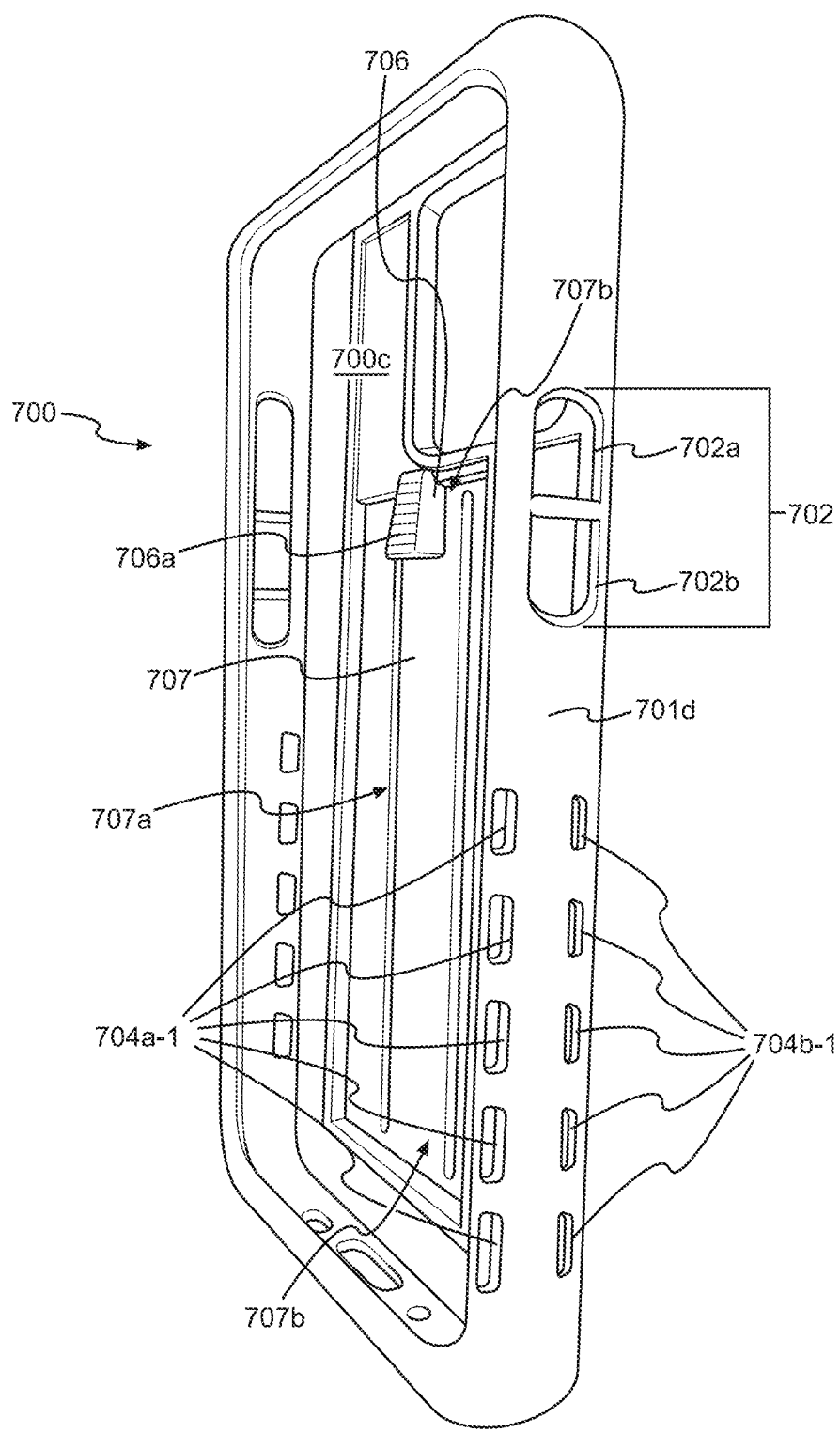
FIG. 7 illustrates the right side perspective view of the disclosed sound redirecting case, according to an aspect.
Figure 8:
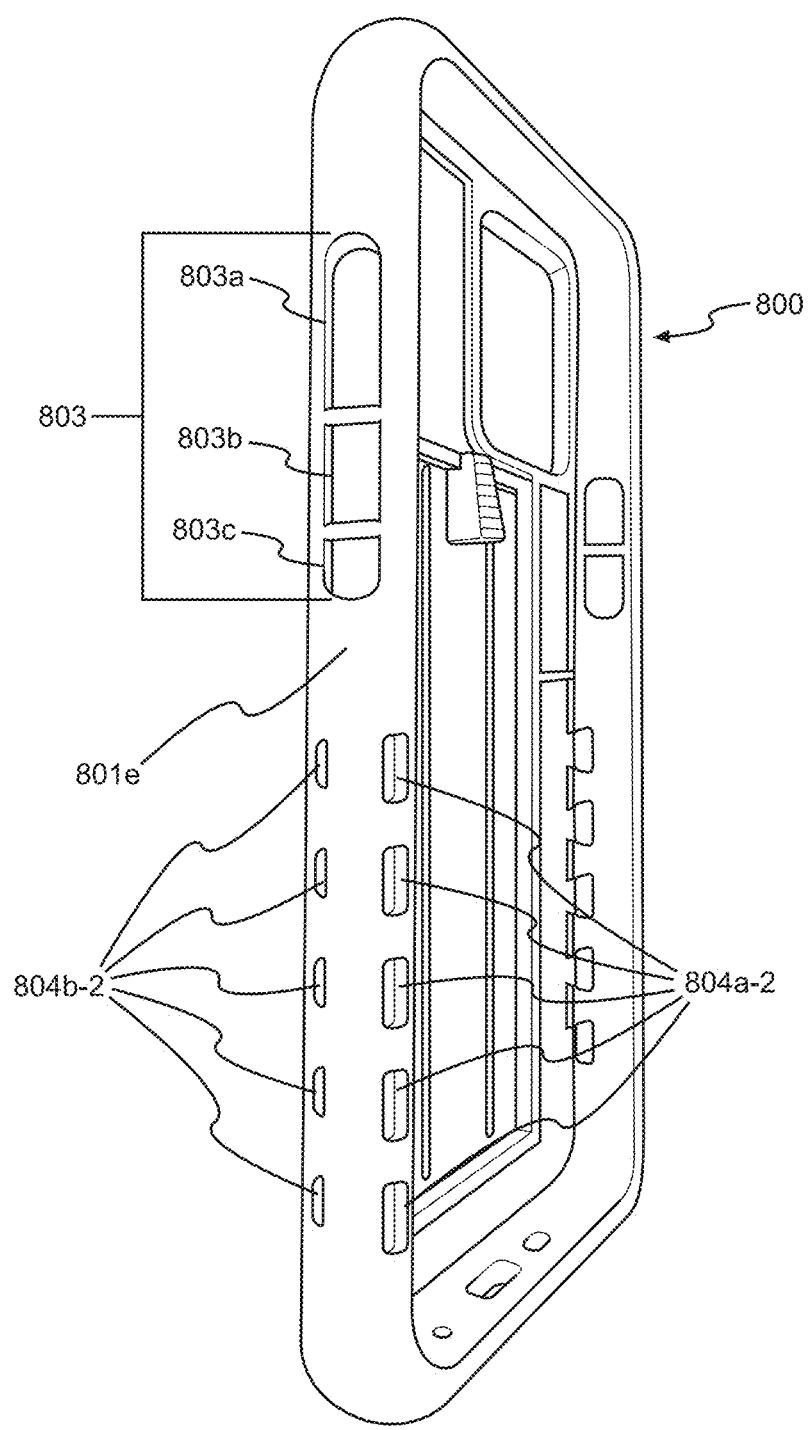
FIG. 8 illustrates the left side perspective view of the disclosed sound redirecting case, according to an aspect.

FIG. 7 illustrates the right side perspective view of the disclosed sound redirecting case 700, according to an aspect. FIG. 8 illustrates the left side perspective view of the disclosed sound redirecting case 800, according to an aspect. As disclosed hereinabove, the right side wall 701d and left side wall 801e may each have a plurality of side ports 702, 803, a plurality of forward facing sound channels 704a-1, 804a-2 and a plurality of backward facing sound channels 704b-1, 804b-2. The right side ports 702 may be comprised of a first right side port 702a and a second right side port 702b nested within the right side wall 701d. The left side ports 803 may be comprised of a first left side port 803a, a second left side port 803b and third left side port 803c nested within the left side wall 801e.

The pluralities of sound channels 704a-1, 704b-1, 804a-2, 804b-2 nested within the left side wall 701d and right side wall 801e, may be configured to help provide a surround sound experience by redirecting the sound emitted from a device held within the redirecting case accordingly. As disclosed hereinabove, the sound channels 704a-1, 704b-1, 804a-2, 804b-2 may be in sound communication with the sound chamber, such as sound chamber 610 of FIG. 6, and the device speakers. The forward facing sound channels 704a-1, 804a-2 may be configured to direct the emitted audio toward a user holding the device, while backward facing sound channels 704b-1, 804b-2 may be configured to direct the emitted sound away from said user. It should also be understood that the audio emitted through the sound channels may also be partially redirected laterally to the left and right of the redirecting case 700, 800, as a result of the positioning and angle that the sound channels 704a-1, 704b-1, 804a-2, 804b-2 form within the corresponding side walls 701d, 801e of the redirecting case 700, 800. As can be seen in FIG. 7, the device engaging end 706a of the strap support 706 may have a slight angle, such that middle portion 707a of the handling strap 707 protrudes out further than the terminal portions 707b of the handling strap 707 while a device is secured within the cavity 700c. This protrusion of the handling strap 707 may allow a user to more easily engage with the redirecting case 700, as disclosed hereinabove.

Figure 9:
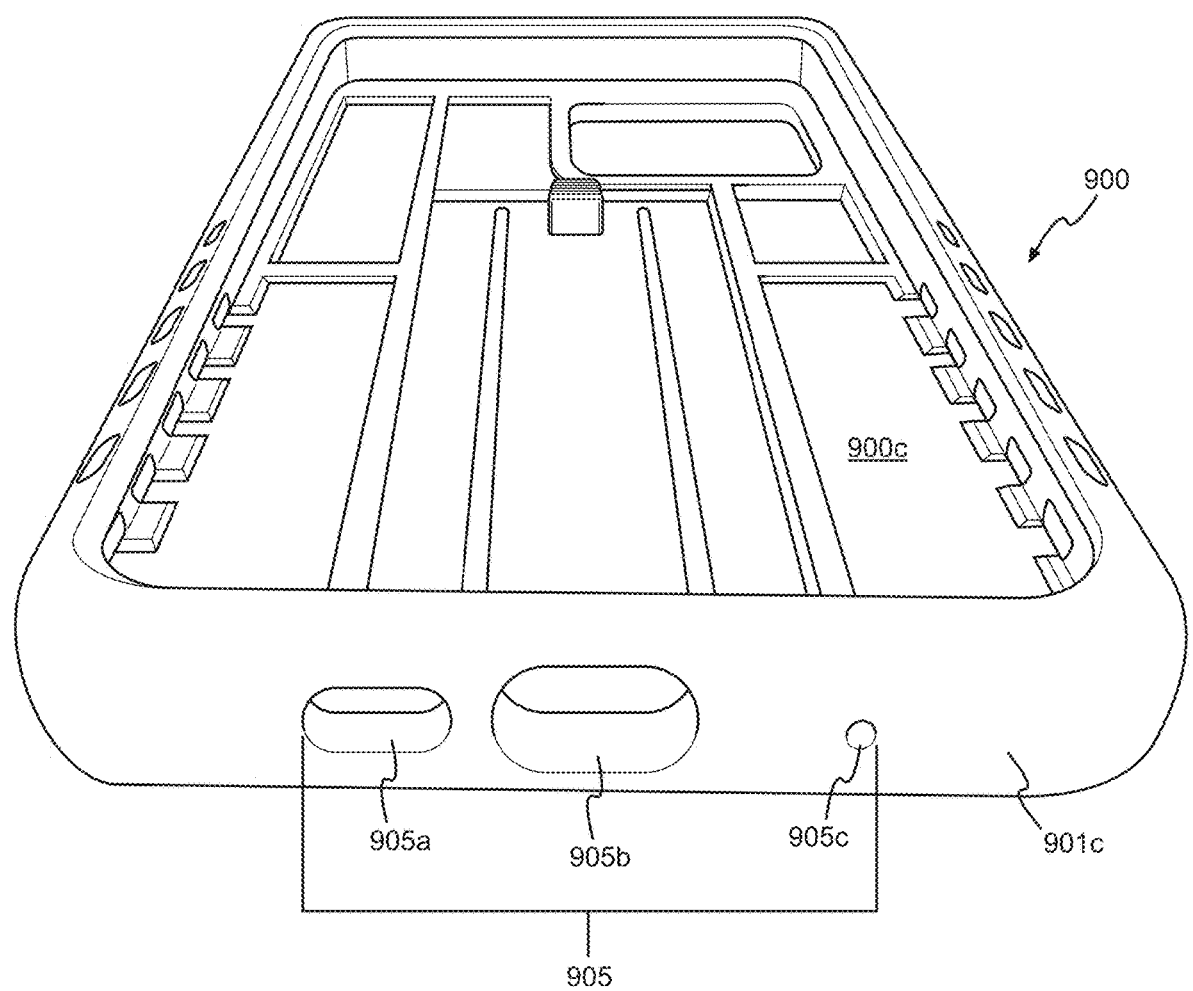
FIG. 9 illustrates the bottom perspective view of the disclosed sound redirecting case, according to an aspect.
Figure 10:
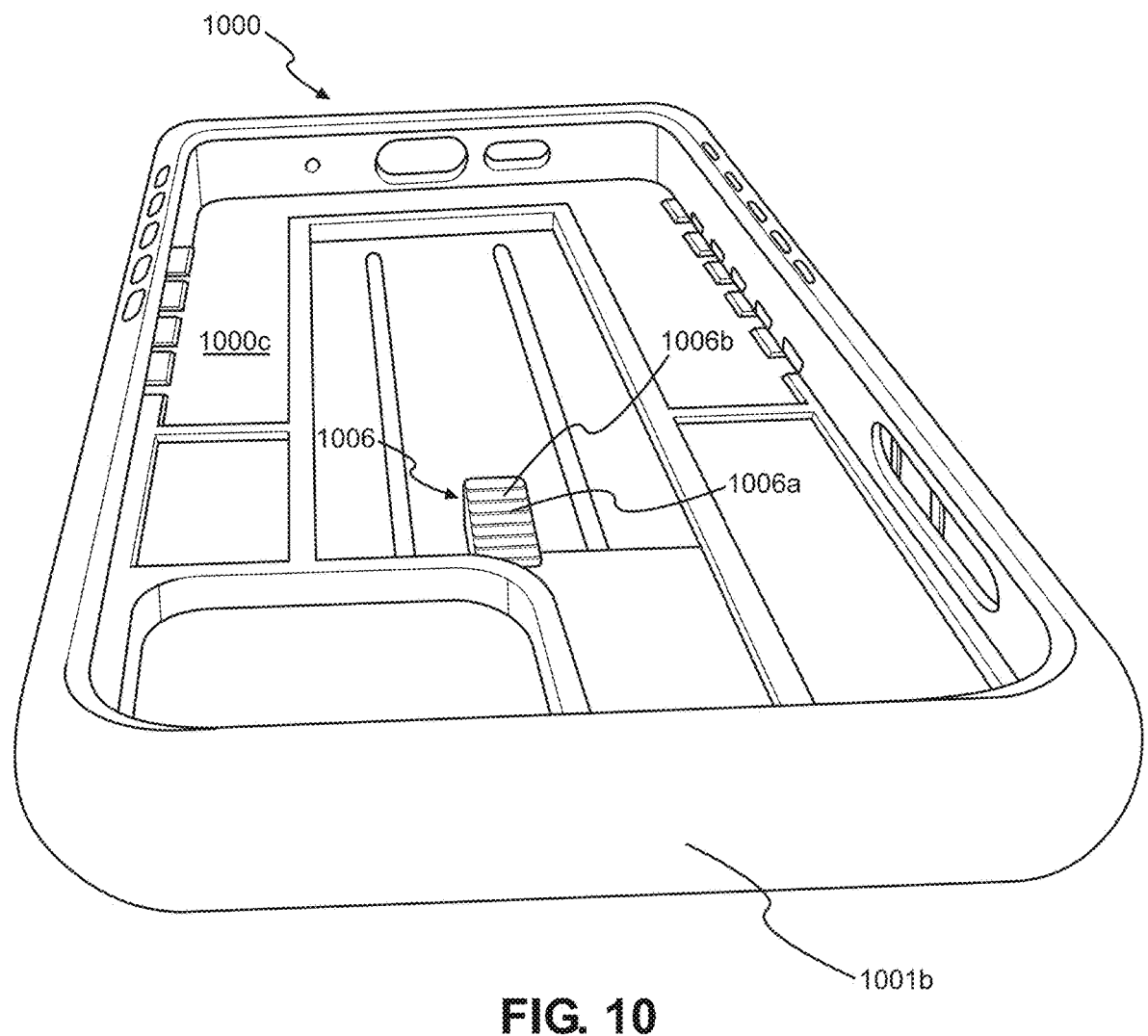
FIG. 10 illustrates the top perspective view of the disclosed sound redirecting case, according to an aspect.

FIG. 9 illustrates the bottom perspective view of the disclosed sound redirecting case 900, according to an aspect. FIG. 10 illustrates the top perspective view of the disclosed sound redirecting case 1000, according to an aspect. As seen in FIG. 9, a plurality of bottom ports 905 may be disposed within the bottom side wall 901c of the redirecting case 900. As disclosed hereinabove, the plurality of bottom ports 905 may be comprised of a first bottom port 905a, second bottom port 905b and a third bottom port/surround sound hole 905c. Each of these ports may be configured to facilitate access to a corresponding port on the device secured within the cavity 900c and/or the emission of audio from said device. The top side wall 1001b of the redirecting case 1000 may be configured to have no ports if there aren't any suitably positioned ports on the held device. As can be seen in FIG. 10, an angled device engaging end 1006a of the strap support 1006 may have a textured interface 1006b configured to securely grip the held device. By securely gripping the held device by its textured interface 1006b, the strap support 1006 may push the attached handling strap 1007 outward away from the cavity 1000c, such that a user may easily engage with the handling strap 1007 as disclosed hereinabove.

Figure 11:
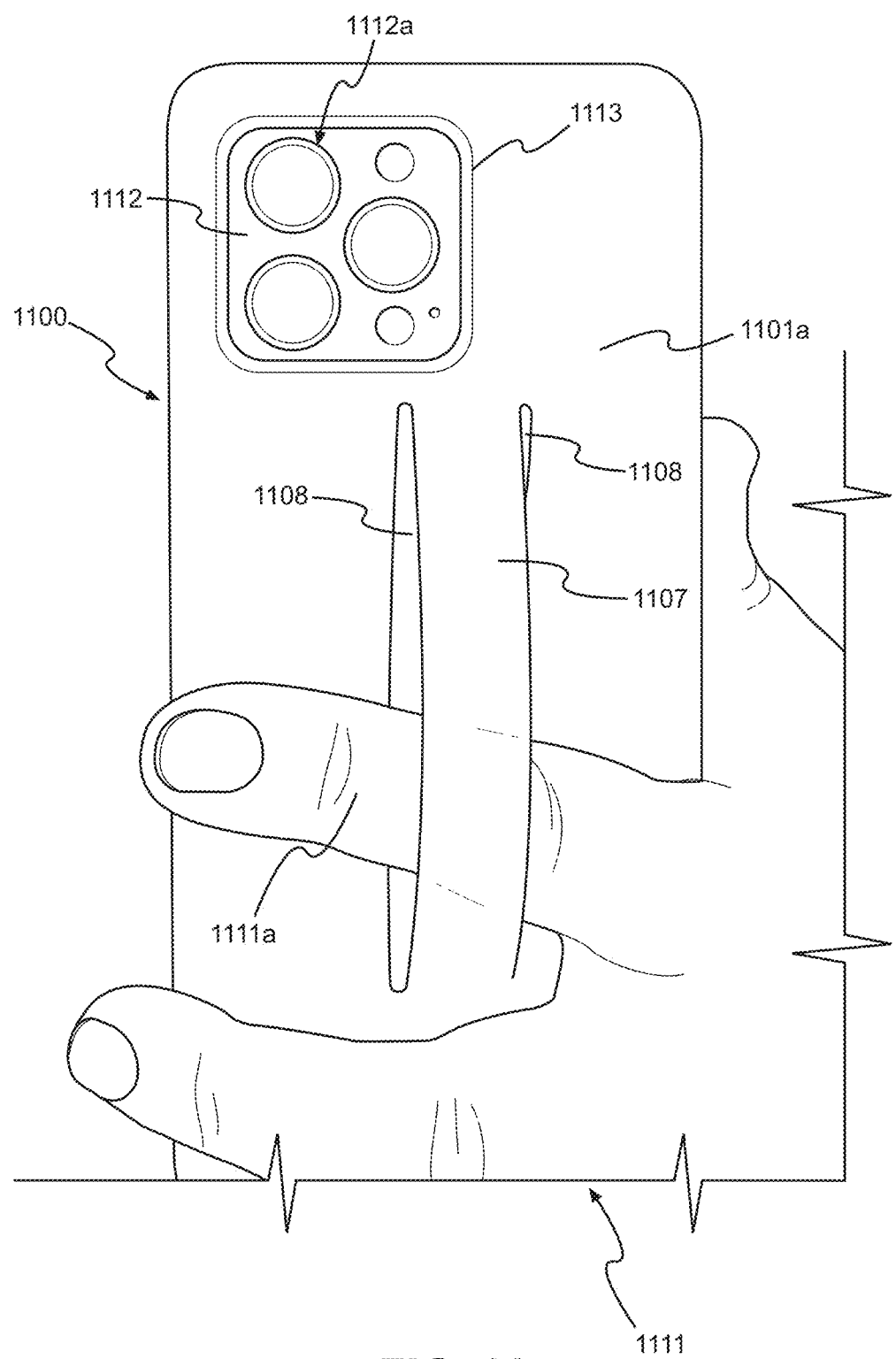
FIG. 11 illustrates a perspective view of a user engaged with a device case, according to an aspect.

FIG. 11 illustrates a perspective view of a user 1111 engaged with a device case 1100, according to an aspect. As disclosed hereinabove, a user 1111 may engage with the device case 1100 by inserting their fingers 1111a through the back slots 1108 of the case device 1100, such that their fingers 1111a are disposed between the case back 1101a and the handling strap 1107. This insertion of the user's fingers 1111a in between the case back 1101a and the handling strap 1107 may be made fast and easy by utilizing a suitably flexible material for the handling strap 1107. As such, a user may engage with the device case rapidly and without undue force. The camera cutout 1113 nested within the case back 1101a may ensure that the camera 1112a on the secured mobile device 1112 is not obscured, and thus remains fully operational. When discussing a user 1111 holding a device 1112 within the redirecting case 1100 herein, it should be assumed that the user 1111 is holding the redirecting case such that a screen on the device 1112 and the forward facing portion of the case, such as forward facing portion 400d of FIG. 4, are facing toward the user, while the back of the device and the backwards facing portion of the case, such as backward facing portion 400e of FIG. 4, are facing away from the user.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

Claim limitations should be construed as means-plus-function limitations only if the claim recites the term "means" in association with a recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. A mobile device case comprising:
a case body configured to secure a device, the case body having:
a case back;
a top side wall attached to the case back;
a bottom side wall attached to the case back, the bottom side wall having a plurality of nested bottom side ports;
a right side wall attached to the case back, top side wall and bottom side wall;
a left side wall attached to the case back, top side wall and bottom side wall;
wherein the top side wall is parallel with the bottom side wall and the right side wall is parallel with the left side wall, such that a cavity is formed between the top side wall and bottom side wall, the cavity being configured to receive the mobile device;
a first plurality of forward facing and backward facing sound channels nested within left side wall;
a second plurality of forward facing and backward facing sound channels nested within right side wall;
a cavity wall associated with the case body, wherein the cavity wall is configured to form a sound chamber within the cavity, wherein the sound chamber is in sound communication with a speaker of the mobile device and the plurality of sound channels, thus allowing sound emitted from the speaker of the mobile device to be guided to the plurality of sound channels.

2. The mobile device case of claim 1, further comprising a pair of back slots nested within the case back, wherein a handling strap is formed within the case back between the pair of back slots.

3. The mobile device case of claim 2, further comprising a strap support associated with the handling strap, wherein the strap support is configured to engage directly with the mobile device.

4. The mobile device case of claim 3, wherein the strap support is disposed within the cavity and the engagement of the strap support with the mobile device causes the handling strap to protrude away from the mobile device.

5. The mobile device case of claim 4, wherein the strap support has an angled device engaging end, such that upon the strap support engaging with the device, a middle portion of the handling strap protrudes further away from the mobile device than terminal portions of the handling strap.

6. The mobile device case of claim 5, wherein the angled device engaging end of the strap support has a textured surface configured to improve the engagement between strap support and the mobile device.

7. The mobile device case of claim 1, wherein the first and second pluralities of forward facing and backward facing sound channels are configured allow sound emitted from the mobile device to be directed forward toward a user and backward out of the mobile device case, thus preventing the sound from being muffled by the mobile device case.

8. The mobile device case of claim 1, further comprising a camera cutout nested within the case bask, wherein the camera cutout is configured to prevent the mobile device case from blocking a camera on the mobile device.

9. The mobile device case of claim 1, wherein the first and second pluralities of forward facing and backward facing sound channels are disposed within a bottom portion of the mobile device case.

10. The mobile device case of claim 1, further comprising a plurality of left side ports nested within the left side wall and a plurality of right side ports nested within the right side wall, wherein the plurality of bottom side ports is comprised of a surround sound hole configured to emit only a portion of a sound emitted from the mobile device out of the bottom side wall.

11. A mobile device case comprising:
a case body configured to secure a mobile device, the case body having:
a case back;
a right side wall attached to the case back; and
a left side wall attached to the case back, wherein a cavity is formed between the right side wall and the left side wall, the cavity being configured to receive the mobile device;
a plurality of forward facing sound channels nested within the case body;
a plurality of backward facing sound channels nested within the case body; and
a cavity wall associated with the case body, wherein the cavity wall is configured to form a sound chamber within the cavity, wherein the sound chamber is in sound communication with a speaker of the mobile device and the plurality of sound channels, thus allowing sound emitted from the speaker of the mobile device to be guided to the plurality of sound channels.

12. The mobile device case of claim 11, further comprising a pair of back slots nested within the case back, wherein a handling strap is formed within the case back between the pair of back slots.

13. The mobile device case of claim 12, further comprising a strap support associated with the handling strap, wherein the strap support is disposed within the cavity and the engagement of the strap support with the mobile device causes the handling strap to protrude away from the mobile device.

14. The mobile device case of claim 13, wherein the strap support has a textured surface configured to improve the engagement between the strap support and the mobile device.

15. The mobile device case of claim 11, further comprising a surround sound hole nested within the case body, the surround sound hole being configured to emit a portion of a sound emitted from the mobile device while redirecting the majority of the sound to the pluralities of sound channels.

16. A mobile device case comprising:
a case body having a cavity configured to receive a mobile device;
a plurality sound channels nested within the case body; and
a cavity wall associated with the case body, wherein the cavity wall is configured to form a sound chamber within the cavity, wherein the sound chamber is in sound communication with a speaker of the mobile device and the plurality of sound channels, thus allowing sound emitted from the speaker of the mobile device to be guided to the plurality of sound channels.

17. The mobile device case of claim 16, further comprising a pair of back slots nested within the case back, wherein a handling strap is formed within the case back between the pair of back slots.

18. The mobile device case of claim 16, further comprising a surround sound hole nested within the case body, the surround sound hole being configured to emit a portion of a sound emitted from the mobile device while redirecting the majority of the sound to the pluralities of sound channels.

19. The mobile device case of claim 16, wherein the plurality of sound channels is in sound communication with speakers on the mobile device in order to release a sound emitted from the speakers toward and away from a device user.

20. The mobile device case of claim 16, wherein the plurality of sound channels is disposed within a bottom portion of the mobile device case.

* * * * *